Aug. 11, 1964

J. W. OEHRLI 3,144,059

SAW CHAIN HAVING DISSIMILAR TEETH

Filed July 19, 1960

JOHN W. OEHRLI, INVENTOR.
WHANN & McMANIGAL
Attorneys for Applicant by Robert M. McManigal

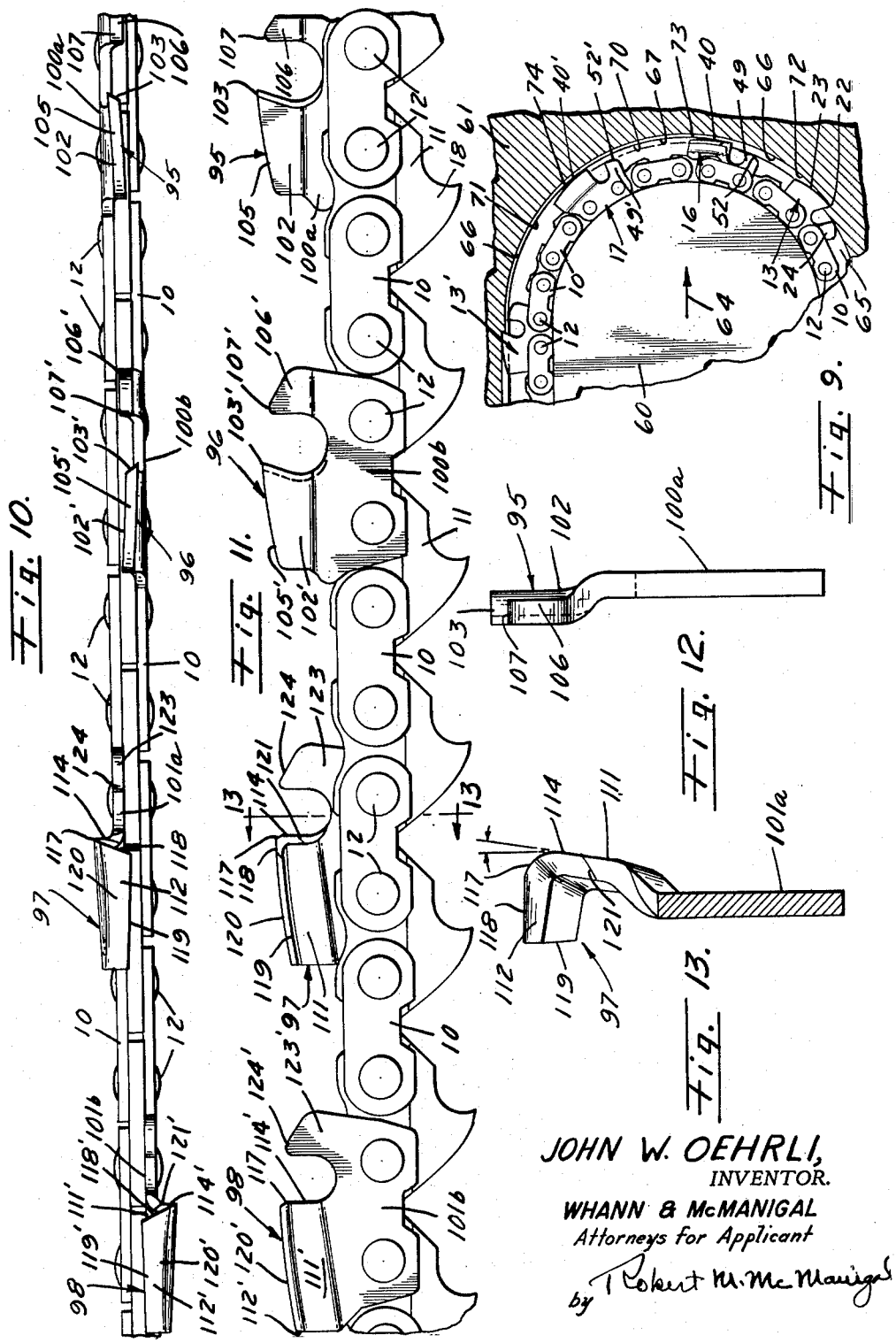

United States Patent Office 3,144,059
Patented Aug. 11, 1964

3,144,059
SAW CHAIN HAVING DISSIMILAR TEETH
John W. Oehrli, Pacific Palisades, Calif., assignor to McCulloch Corporation, Los Angeles, Calif., a corporation of Wisconsin
Filed July 19, 1960, Ser. No. 43,857
7 Claims. (Cl. 143—135)

This invention relates to saw chains having dissimilar teeth and more particularly to a saw chain having side cutters and center cutters and in which the center cutter or cutters cut a central groove and the side cutters cut the bottom and side walls of the kerf on opposite sides of the central groove.

It is an object of the invention to generally improve saw chains so that they provide smoother performance, improved cutting efficiency and have longer useful life.

It is an object of the invention to provide a saw chain having center cutters to cut a groove in the kerf forwardly of and deeper than the cuts made by the side cutters and to permit the side cutters to cut only the side portions of the bottom of the kerf. This arrangement reduces the width of the cut made by each side cutter and it thereby reduces drag on the top plate or toe of the side cutter.

It is another object of the invention to provide side cutters which do not reach or cut in the center of the kerf, the center portion having been cut by the center cutter. This permits a thinner center top plate or toe on the side cutters as their work load is considerably reduced.

It is still another object of the invention to provide a saw chain in which the side cutters cut chips having a width of less than half of the kerf so as to permit easier chip removal from the kerf.

A further object of the invention is to provide a saw chain in which single chips are completely cut out of the kerf by each cutting action of each side cutter. This is accomplished by having side cutters cut only that part of the bottom of the kerf outwardly of the center. This eliminates partially cut or laminated chips which are usually formed when the side cutters overlap; that is, one side cutter will partially cut a chip and the second, or so-called conventional finishing cutter in its cutting action will not only cut a chip on its side of the kerf but will also cut into the laminated or partially cut chip left in the kerf by the previous opposite side cutter. In other words, side cutters according to the present invention cut the chips so that they are limited in thickness to that of a chip properly and completely cut in one action of the cutter in contrast to increased thicknesses of chips which are not completely cut by one cutter. This provides for that additional drag elimination on the side cutters.

It is a still further object of the invention to provide a saw chain having a toe of thinner metal than was heretofore desirable or possible in the prior chains where the side cutters overlapped and cut a wider chip than that required according to operation of the present invention. Having a thinner toe provides the advantage of permitting a smaller bending radius and a much smaller outside radius between the toe and the shank of the side cutters and thereby makes possible the optimum stamped cutter shape in contrast to the usual reversed curved cutters most commonly used. By having the surfaces of the toe and shank of the side cutters flat and having the radius between them small, the cutter is more efficient because it reduces to a minimum the cutting of end fibers by the side portion of the cutter. That is, with a flat-sided shank having a small radius bend between it and the toe, the cut made by the side of the cutter on the side of the kerf is short and, therefore, cuts less end fibers. This configuration is particularly desirable in that it permits an optimum shaped cutter to be made by a stamping process rather than by forging. A small radius corner between the toe and the shank has the advantages over a sharp cornered cutter, with no radius, of being less likely to be damaged and of being easier to sharpen with a file. Moreover, the present optimum configuration permits a very short shank cutting edge so that the entire cutter can be shapened using a file in a single position.

Another object of the invention is to provide stamped side cutters having between the toe and shank an outside bend arc which does not extend vertically as far as the level of the inner face of the toe and horizontally as far as the level of the inner face of the shank.

It is another object of the present invention to provide a saw chain having three or more different cutters in sequence; that is, one or more center cutters followed by a pair of allochiral oppositely disposed side cutters. This arrangement produces a thicker bite or a thicker but completely removed chip with each cut to increase the efficiency at high chain speed, and on larger logs, at low and medium speeds. It further eliminates the roughness created in the typical "skip" tooth arrangement in that in accordance with the present invention the center cutters act as the gauges to prevent bouncing of the chain.

It is still another object of the present invention to provide a saw chain in which the side cutters have substantially flat parallel sides, both in the shanks and the toes in transverse section, to produce cleaner cuts on the kerf walls so as to reduce the kerf width minimum required for the saw bar clearance.

Another object of the invention is to provide a saw chain having curved top surfaces on the cutters and depth gauges, said curves extending rearwardly and vertically inwardly from the cutting edges. This improves the boring performance especially when the radii of the curves on the cutters are approximately equal to the radius of the cutters on the end of the saw bar and have approximately the same center as the end of the bar about which the cutters rotate. In this arrangement the depth gauges lie substantially on the same arc as the top surfaces of the cutters so as to produce a very smooth boring operation.

Still another object of the invention is to provide center cutters having top surfaces which are relieved rearwardly and laterally from the cutting edge to eliminate binding of the cutter and to reduce the chip pressure against the face of the cutter.

A principal object of the invention is to provide side cutters having substantially flat parallel sides and having substantially stright line cutting edges which may be filed with a flat sided file having a curved edge. This arrangement permits the curved edge of the file to move on the cutting edge surface provided by the small bending radius and permits the flat surface of the file to move on the beveled edges, both on the toes and shanks, so that the cutting edges can be sharpened accurately and more easily than was heretofore possible, the flat surfaces being easier to follow than a curved surface which forms a cutting edge.

Another object of the invention is to provide side cutters having long life beveled cutting edges formed at the forward portion of the outer surfaces and the forward portion of the bevel. Long life cutting edges are made in the present cutters by having relatively thick supporting bevels for the cutting edges. These are made possible by the flat surfaces on which the cutting edges are formed and are further enhanced by using the aforesaid flat type of file for sharpening to eliminate feathering or undercutting of the bevel which occurs when a circular file is used on the typical reversed curved cutters.

Another object of the invention is to provide side cutters on which the cutting edges on both the shanks and toes can be sharpened by holding the file in one position relative to the edges.

Further objects and advantages of the invention may be brought out in the following part of the specification wherein small details have been described for the competence of disclosure, without intending to limit the scope of the invention which is set forth in the appended claims.

Referring to the accompanying drawings, which are for illustrative purposes only:

FIG. 1 is a plan view of a portion of a saw chain of one form of the invention;

FIG. 2 is a side view of the chain shown in FIG. 1;

FIG. 3 is a plan view of a center cutter similar to those shown in FIG. 1 having a beveled top surface;

FIG. 4 is a front end view of a side link shown in FIGS. 1 and 2 and having a depth gauge and a side cutter thereon;

FIG. 5 is a fragmentary end view illustrating the relationship of two oppositely directed allochiral side cutters with the vertical center plane of the chain;

FIG. 6 is an end view of the groove and kerf cut by the center and side cutters, respectively;

FIG. 7 is a plan view of a side cutter with a flat-sided file having a curved edge in postion for sharpening a continuous cutting edge;

FIG. 8 is a side elevational view of the cutter and file shown in FIG. 7;

FIG. 9 is an enlarged partly sectional view showing the cutter teeth of the chain depicted in FIG. 1 in boring position as they travel around the end of a suporting blade;

FIG. 10 is a plan view of a portion of a saw chain of another form of the invention;

FIG. 11 is a side view of the chain shown in FIG. 10;

FIG. 12 is a front end view of a center cutter and depth gauge on a side link taken as indicated by the line 12—12 of FIG. 11; and FIG. 13 is a front end view of a side cutter on a side link taken as indicated by the line 13—13 of FIG. 11.

Referring again to the drawings, there is illustrated in FIGS. 1 and 2 a saw chain including side links 10 and center links 11 connected consecutively by pintles 12. At the right in the drawing on the forward portion of the chain is a selected center link 11a having extending vertically outwardly therefrom a groove cutting center cutter 13 followed by a pair of allochiral, left and right hand side cutters 16 and 17 extending vertically outwardly on selected side links 10a and 10b, respectively, on opposite sides of the chain. The aforesaid three cutters form a complete cutter group in the chain and each group is preceded by a similar group and likewise followed by such a group, as indicated at the left in FIGS. 1 and 2, by a second center cutter 13'. Extending downwardly from each of the center links including 11a are sprocket engaging projections 18 by which the chain is driven on a sprocket.

Each center cutter is comprised of a flat-sided shank 19 extending vertically outwardly from a selected center link and from the horizontal or transverse plane $a$—$a$ of the chain. At its upper end is a transverse cutting edge 22 of the same thickness as the shank. Transverse cutting edge 22, as shown in FIG. 2, extends the distance A vertically outwardly from the horizontal plane $a$—$a$ and extending rearwardly and vertically inwardly from cutting edge 22 is a curved top surface 23 of the center cutter.

Forwardly of each center cutter on its selected center link and spaced therefrom is a depth gauge 24 which is of lesser height than the cutting edge by the distance B, indicated in FIG. 2. Its outer surface 25 is formed to have approximately the same radius as the curve of the outer surface 23; that is, it lies approximaately on an arch having the same center and radius as that of surface 23.

In FIG. 3, there is a plan view of a center cutter 28 which is formed by having its curved top surface 29 relieved rearwardly and laterally to form a beveled surface 30 and also has a transverse cutting edge 31 which trails towards the rear. This type of center cuttter provides the advantages of eliminating binding during the cutting operation and chip pressure against the inside face.

Following each center cutter are the first and second side cutters 16 and 17, each of which make an independent cut on opposite sides of the bottom of the kerf, the center portion of the kerf having been removed by the groove cutting center cutter. In prior saw chains the second cutter was frequently referred to as a finishing cutter in that it finished the cut made by the first cutter where the first cutter did not completely sever the chip from the bottom of the kerf. Here, the second cutter is not a finishing cutter as the first cuttter completely removes a chip on one side of the bottom of the kerf and the second cutter independently removes a chip on the second side of the bottom of the kerf.

The first cutter 16 is comprised of a web or shank 34 extending vertically outwardly and being offset transversely outwardly from the selected side link 10a. The shank 34 has substantially flat parallel sides and trails transversely inwardly, as indicated by the angle 37 in FIG. 4 to provide clearance at the side of the kerf. Extending inwardly from the outer portion of the shank is a transverse toe portion 35, the toe and shank portion being joined by a bend 36, best seen in FIG. 4, formed by a relatively small bending radius and having a small outside radius. The toe portion has substantially flat sides forming straight lines in transverse section and extends at an approximate right angle, slightly obtuse, from the shank. At the forward end of the toe there is a transverse cutting edge portion 38 formed on an inwardly facing toe bevel 39 and extending longitudinally rearwardly and vertically downwardly therefrom is a curved outer surface 40 of the toe having the same radius as the top 23 of the center cutters.

The forward edge of the shank 34 has an inwardly facing bevel surface 42 terminating forwardly in the substantially vertical shank cutting edge 43. The bevel 42 is joined by a bevel on the bend 36 and the bevel 39 on the toe 35 to form a continuous bevel surface on which is formed a continuous cutting edge consisting of the shank cutting edge portion 43 and the toe cutting edge portion 38 and with a short bend cutting edge portion joining the two. The cutting edge of the toe is at an approximate right angle to the cutting edge of the shank. The toe cutting edge extends the greatest distance on the side cutters from the horizontal plane $a$—$a$ of the chain and is designated as C, being equal to the distance of the depth gauge of the center cutters from the plane $a$—$a$.

Spaced forwardly of the first side cutter is a depth gauge 49 which, like the depth gauge on the center cutter, has its top surface 52 substantially on the same arc as that of its side cutter 16. It is shorter than the cutter and extends inwardly therefrom a distance D, shown in FIG. 2.

The second side cutter 17, mounted on a selected side link 10b on the opposite side of the chain from the first side cutter, is shown with its parts corresponding to those in the first side cutter and depth gauge with the same reference numerals having a prime sign added. In FIG. 5, the two oppositely disposed side cutters 16 and 17, are shown in end view in spaced relationship on opposite sides of the center longitudinal or vertical plane of $b$—$b$ of the chain. Here it is clear that the inner edges of the respective toe portions 35, 35', as also may be seen in FIG. 1, do not overlap but are spaced at equal distances E and F from the center plane $b$—$b$. Distance E plus F equals the total distance G of the inner portions of the toes from each other, it being less than the width of the cutting edges 22 or 31 on the center cutter, so that as may be seen in FIG. 1 the toes of the side cutters overlap the path made and groove cut by the center cutter.

In FIG. 6 is illustrated a kerf 53 as cut by the chain of the present invention and shown in an instantaneous view where the center cutter 13 has cut an advance groove 54 and the first side cutter 16 has made a cut 55 immediately after the center cutter, removing a chip which had extended up to the dotted line 56. The level of the bottom of the kerf at removed chip line 56 is the same as that on the other side bottom 58, which will be cut down to the level 59, shown in dotted lines, the same level as bottom surface 55, when the second side cutter makes its cut and completes the cutting action of the group of cutters formed on one center cutter and two consecutive side cutters.

The width H of the kerf 53 is determined by the distance between the two outermost points on the shanks of the side cutters plus the extent of their lateral variable movements. The depth of the groove 54 is equal to the distance B, extending downwardly from bottom surfaces 56 or 58 before the cuts made by the side cutters, and which is the distance between the outer edge of the depth gauge 24 and the cutting edge 22 on the center cutter. Similarly, the depth of the cut 55 below the level 56 is equal to the distance D, which is the distance between the top 40 of side cutter 16 and the top of its depth gauge 49, the same relationship existing between the level 58 on the bottom of the other side of the kerf and the cut to be taken to level 59 by the second cutter. Since the distance from the horizontal plane $a$—$a$ to the cutting edge 22 on the center cutter is A, and the distance to the outermost point of the toe on the side cutters from the horizontal plane is C, which is equal to A minus B, a groove 54 cut by the center cutter will always be lower than the side bottoms 55 and 59 of the kerf cut by the following side cutters. This, of course, means that the side cutters never cut at their innermost portions because they overlap the path of the center cutter; that is, the groove 54 is wider than the distance G between the side cutters, shown in FIG. 5. This results in the elimination of a considerable amount of drag on the toes of the side cutters and further eliminates the drag which ordinarily would be caused by the tearing of wood at the center when two side cutters, which overlapped, did not make a complete cut or completely dismember a chip from the bottom of the kerf. Thus, because the side cutters do not cut at the center of the kerf, less load is put on them and they may be made of thinner metal. This permits the side cutters to be stamped, rather than made by expensive forging, into the substantially optimum shaped cutter which has a small bending radius and a very small outside radius between the toe and shank at the bend 36.

By having such a minimum radius on the side cutters the cutting is more efficient because it reduces the amount of end fibers cut along the outside (vertical in FIG. 6) edges of the kerf adjacent the bottom. In other words, when the shank cutting edge 43 and the toe cutting edge 38 are at an approximate right angle to each other, with a minimum bend 36 between them, the effectual or actual cutting edge of 43 is shortened. That is, less end fibers are cut by it and the cutting of the kerf occurs on its bottom by the toe cutting edge 38 rather than by a substantial portion of the shank cutting edge, as with the reversed curved-tooth type cutters. A small radius corner between the toe and the shank also provides an advantage over side cutters with sharp angle corners and with no radius in that the former are much harder to damage than the latter and also are easier to sharpen.

A further advantage of having the center cutter cutting a groove ahead of the side cutters and at a lower level, is that each side cutter cuts chips less than half the width of the kerf and each chip is completely disengaged from the bottom end side of the kerf by each individual cutter. Stated differently, there are no partially cut or laminated chips formed by one side cutter making an incomplete cut and leaving the chip secured on the other side of the kerf so that the second cutter, or so-called prior art finishing cutter, has to remove a chip partially cut by the first cutter and in so doing leaves a partially cut double layer or laminated chip for severing by the next first side cutter. In addition, since the chips are narrower than half the kef, they are much more easier removed. This, of course, results in smoother and more efficient operation.

Further advantages of having three or more cutters in sequences are that a thicker bite or thicker individual chip can be cut to increase efficiency at high speeds, and in cutting the larger logs at medium and low speeds. This particular arrangement eleminates the roughness found in typical skip-tooth arrangements because here the center cutters act as depth gauges to prevent bouncing.

In FIG. 9 a boring operation is illustrated. Here the chain is extended around the ends of a saw blade or bar 60 during its employment in the operation of boring into a log 61. As the blade 60 is moved in the direction of the arrow 64 the cutter group comprised of the center cutter 13, the first side cutter 16, and the second side cutter 17, cuts a recess or bore 65 substantially equivalent in cross section at the cutting surface to the kerf, as shown in FIG. 6. As the blade is held in place and the chain continues to travel on it, the bore 65 consisting of a narrow slot, will be cut through the log. It has been found that in having the tops of the cutters and their depth gauges formed to have approximately the same radius as the curve of their path of travel on the end of the bar, boring performance is greatly increased. Thus, the curves of the individual tops of each cutter, such as surface 23 on center cutter 13 and surfaces 40, 40' on side cuters 16 and 17, are formed having a radius approximately equal to that of the curved path they cut into the bore. When they are so constructed with the top surfaces trailing rearwardly and inwardly toward the center of the end of the blade 60, there is considerable clearance provided at the trailing portions of the top surfaces of the cutters and the surface cut by them, as indicated at 72, 73 and 74 in FIG. 9. The top surfaces of the depth gauges also are substantially of the same radius and lie on substantially the same arc as the individual cutter preceding them. Then, as the cuters are sharpened, the top surfaces of the depth gauges are also filed but the front part of the depth gauge portion remains at its optimum distance for boring and the clearance between their top surfaces and the bore surface being cut remains the same.

In the boring operation showing the three cutters 13, 16 and 17, in an instantaneous view, the top of the center cutter gauge 25 rides in the groove cut by the previous center cuter, which is below the surface cut by the side cutters which follow it. The cutting edge 22 of the center cutter 13 thus cuts a groove 66, which, in end view, would have the appearance of groove 54 in FIG. 6. Following the center cutter is the first side cutter 16, the top of its depth gauge riding on the surface cut by the preceding side cutter. Here this first side cutter makes a cut to the level 67, as deep as the cut made by the center cutter, and, similarly, the second side cuter makes an equivalent cut on the other side of the bore down to the level 70. After the group of three cutters have passed through one position, the completed cut is made to the level of 71 with the groove 66 being slightly below it.

In FIGS. 7 and 8 the sharpening operation of the side cutters, according to the present invention, is illustrated. By having the shank cutting edge of 43 as well as the toe cutting edge 38 flat, with the bend 36 of small radius therebetween, it is possible to sharpen the toe, shank and bend portions of the continuous cutting edge with a file 76 in one position, as shown in FIGS. 7 and 8, on the cutter. The file has two opposite flat sides 77 and 78, which terminate in semicircular edges 79. Specifically, as the shank portion of the cutting edge is permitted to be short in the present invention because it cuts very few end fibers, the major cutting work being accomplished by the to edge, by positioning the file as shown, with its flat side 77 on the cutting edge of the toe and the curved portion 79 of the file on the bend area, the entire toe edge 38, the bend edge, and a short but sufficient portion of the shank is sharpened in the one-position operation of the file. In having a flat-sided file to be used in a single position, it is easier to file the cutting edges and to file accurately so as to maintain the correct bevel angle inwardly thereof. This permits the continual provision of a relatively thick supporting beveled structure and avoids the creation of feathered cutting edges, the result being longer cutting life for the individual cutters, as well as the maintenance of a substantially optimum-shaped continuous cutting edge.

In FIGS. 10 and 11, another form of the invention is illustrated. The chain is formed basically having side links 10 and center links 11 joined by pintles 12. Here, however, the cutting group is comprised of four cutters, namely, two consecutive spaced allochiral center cutters 95 and 96 extending vertically outwardly on selected side links 100a and 100b, respectively, disposed on opposite sides of the chain, and two following consecutive spaced allochiral side cutters 97 and 98 extending vertically outwardly on oppositely disposed selected side links 101a and 101b, respectively. In this arrangement the center cutters cut a wider center groove than that cut by center cutter 13 in FIG. 2 and this enables the side cutters to take a thicker bite to increase the efficiency of the saw at high speeds, or on larger logs at medium and low speeds, it eliminates the roughness usually found in skip tooth arrangements as the center cutters act as depth gauges relative to the side cutters to prevent bouncing.

The first center cutter 95 is formed on a shank 102 which extends vertically outwardly above the center horizontal plane of the chain and is offset transveresly inwardly, as best seen in FIGS. 10 and 12, so as to be disposed from the outer surface of the side link 100a so that its transverse cutting edge 103, formed at the forward and highest portion of the shank, is cut by the vertical center plane of the chain, or, stated differently, the cutting edge of the center cutter overlaps the center of the chain. The cutting edge has its foremost point on its side toward its side link and trails rearwardly and transversely toward its opposite side. The forward surface of the shank below the edge has the same transverse direction as the latter and as the edge is sharpened the forward surface below it becomes the cutting edge. The shank portion trails rearwardly inwardly on the vertical center plane of the chain so as to provide chip clearance outwardly thereof. Extending rearwardly and downwardly from the the cutting edge 103 is the center cutter top 105 lying in an arc having substantially the same radius as the path of the cutters on the end of the saw blade, as in FIG. 9.

The second center cutter 96, equivalent to but disposed on the opposite side of the chain from the first cutter 95, is shown with its parts corresponding to those in the first cutter with the same reference numerals having a prime sign added. In order to cut a single but wider groove than cut by center cutter 13 in FIG. 1, the cutting edges 103, 103' overlap centrally on the central vertical plane of the chain as may be seen in FIG. 10.

Spaced forwardly from the cutters 95 and 96 on the selected side links 100a and 100b and extending vertically outwardly therefrom are depth gauges 106, 106', respectively, both of which lie substantially on the same arc as that of the cutter following it. The outer edges 107, 107' of the depth gauges have the same relation to the cutting edges 103, 103' as those in FIG. 2 in that they are forwardly on the links at a lower point on the arc, the cutting edges being on substantially the highest point on the arc, and they are the distance B shorter than the cutting edges as measured from the horizontal center plane of the chain. As best seen in FIG. 12, showing the front end view of center cutter 95, depth gauge 106 is offset inwardly to have its inner vertical surface in alignment with the forward edge of the inner surface of the shank of the cutter.

The side cutters 97 and 98 are left and right-hand equivalents, their corresponding parts having the same reference numerals but with the prime sign added to those of cutter 98. Cutter 97 is formed having a flat, parallel sided shank 111 extending vertically outwardly from the horizontal center plane of the chain on the side link 101a. The shank is transversely offset outwardly from the side link and extending from its upper portion is the transverse toe portion 112 directed inwardly toward the vertical center plane of the chain but terminating outwardly thereof, as best seen in FIGS. 10 and 13. The shank trails rearwardly inwardly, as indicated by the angle 113 in FIG. 13. At its forward edge the shank 111 has a substantially vertical beveled cutting edge 114 joining a small bend cutting edge 117 which in turn joins with the toe cutting edge 118 to form a continuous stamped substantially right angled cutting edge. The toe cutting edge trails transversely rearwardly in a straight line and is approximately at a right angle to the vertical plane of its selected side link and the inner longitudinal edge 119 of the toe trails longitudinally transversely outwardly from the forward inner end of the toe cutting edge. Top surface 120 of the toe is curved approximately in accordance with the radius of its path in the boring operation, similar to the center cutters, and trails rearwardly downwardly from the cutting edge to provide the proper clearance with the bore being cut.

Here, again, the highest point on the side cutters outwardly from the central horizontal plane of the chain is on the toe cutting edge and this is shown to be at the same distance from the latter plane as the tops of the depth gauges on the center cutter; that is, the side cutters make a shallower cut than do the center cutters. Because of the considerable width of the groove cut by the overlapping cutting edges of the center cutters, the cutting load is greatly reduced on the toes of the side cutters. Therefore, the toes may be thinner than when usual loads are cut, and thinner than those in FIG. 2, so that the cutters can be stamped from thin metal with the result that the bend radius between the shank and the toe is very small and the outside radius of the bend does not extend at its upper end as far transversely inwardly as the inner surface of the shank and at its lower end does not extend as far downwardly as the lower surface of the toe. In other words, the outer surface of the bend 117 is so short that it is substantially flat, as best seen on cutter 97 in FIGS. 11 and 13, and the toe is stamped to be substantially 90° to the shank cutting edge 114. Since the bend is short, a more optimum shape stamped cutter is produced. That is, the shank cutting edge is made very short because it is required to cut very few end fibers on the side of the kerf and substantially all of the cutting is effected by the toe cutting edge on the bottom of the kerf. The short cutting edge of the shank is indicated by its inner boundary line 121.

Each of the inner toe surfaces extend inwardly to a point immediately transversely outwardly of the center vertical plane of the chain so as to overlap the cutting edges on the center cutters and overlap the groove which they cut forwardly of the side cutters. The longitudinal edges 119, 119' of the toes trail rearwardly outwardly but are positioned so that as the toe cutting edges and the center cutter edges are sharpened, they will continue to be in the same relative relationship so as to overlap the path and the groove cut by the center cutters. Stated differently, the distances apart of the paths made by the toes of the two side cutters are always less than the combined width of the center cutters as overlapped, and the width of the combined groove cut by them so that the inner edges of the toes extend into the groove and thereby reduce the drag and load on the toe cutting edges.

The depth gauges 123, 123' for cutters 97 and 98 extend vertically outwardly in the same plane as their selected side links and their top surfaces 124, 124', lie substantially on the same arc as the tops of the toes of their respective side cutters. The outer edges of the depth gauges are vertically inwardly of the outer cutting edges of the toes similar in relationship to the side cutters and their depth gauges in FIG. 2.

The cutting operation of the four cutters is substantially the same as that described relative to FIG. 6, except where there are two center cutters the cutting is smoother and there is less load on the toes of the side cutters as the center cutters extend transversely more outwardly than the single center cutter mounted on a center link. In addition to greater smoothness and more efficiency, the toes may be made of thinner metal so that the side cutters can be stamped with a smaller bend to make a more optimum shaped cutter and to reduce the amount of end fibers cut by the shank portion of the side cutters. In other words, in the chain illustrated in FIGS. 11 and 12, the chips cut by the side cutters are narrower than those cut by the side cutters illustrated in FIGS. 1 and 2, and this makes more smoother cutting, as well as more efficient and bigger bite cutting.

The side cutter 97, best seen in FIGS. 11 and 13, having a shorter shank cutting edge, as indicated at its lower portion at line 121 than the cutting edge shown in FIGS. 7 and 8, is very easily filed and may be filed with the same round edge, flat-sided file, the round edge fitting in the short bend bevel 117 and one of the flat sides fitting on the toe bevel to sharpen the toe edge while the lower sharpening portion of the file abuts the lower line 121. This type of filing is extremely accurate for maintainnig the proper bevel to provide a thick supporting structure and avoids undercutting or forming a feather edge. The result is a longer life and less easily damaged side cutters.

It is clear that the various cutters and their relationship with each other may be used in various other forms without departing from the inventive principles disclosed herein relating to the arrangement of center cutters preceding side cutters and to the optimum configuration and transverse spacing of the side cutters.

I claim:

1. In a saw chain: side links and center links disposed along a vertical median plane of the chain and alternately connected by hinge means disposed on transverse hinge axes; center cutter elements for cutting a groove in the material to be sawed extending outwardly from selected links, said center cutter elements each having a flat blade portion with a forward transverse cutting edge in a horizontal plane which is normal to the vertical median plane of the chain; and side cutter elements positioned on opposite sides of the chain for cutting a kerf in the material to be sawed, said side cutter elements comprising shank portions which extend outwardly from selected side links and toe portions which extend from the outer edge of said shank portions, and said cutting edge on said center cutter elements extending farther outwardly than said toe portions.

2. In a saw chain: side links and center links disposed along a vertical median plane of the chain and alternately connected by hinge means disposed on transverse hinge axes; center cutter elements for cutting a groove in the material to be sawed extendnig vertically outwardly from selected links, said center cutter elements each having a flat blade portion with a forward transverse cutting edge in a horizontal plane which is normal to the vertical median plane of the chain; and side cutter elements positioned on opposite sides of the chain for cutting a kerf in the material to be sawed, said side cutter elements comprising shank portions which extend vertically outwardly from selected side links and toe portions which extend from the outer edge of said shank portions, said cutting edge on said center cutter elements extending farther vertically outwardly than said toe portions, and said toe portions extending transversely toward and terminating laterally outwardly of the vertical center plane of said chain, the successive toe portions along said chain extending in opposite transverse directions.

3. In a saw chain: side links and center links disposed along a vertical median plane of the chain and alternately connected by hinge means disposed on transverse hinge axes; center cutter elements for cutting a groove in the material to be sawed extending verticaly outwardly from selected links, said center cutter elements each having a flat blade portion with a forward transverse cutting edge in a horizontal plane which is normal to the vertical median plane of the chain, the vertical center plane of said chain extending through the cutting edges of said center cutters; and side cutter elements positioned on opposite sides of the chain for cutting a kerf in the material to be sawed, said side cutter elements comprising shank portions which extend vertically outwardly from selected side links and toe portions which extend from the outer edge of said shank portions, said cutting edge on said center cutter elements extending farther vertically outwardly than said toe portions, said toe portions extending transversely toward and terminating laterally outwardly of the vertical center plane of said chain, and said toe portions terminating laterally inwardly of the cutting edges of said center cutters, the successive toe portions along said chain extending in opposite transverse directions.

4. In a saw chain: side links and center links disposed along a vertical median plane of the chain and alternately connected by hinge means disposed on transverse hinge means disposed on transverse hinge axes; center cutter elements for cutting a groove in the material to be sawed extending vertically outwardly from selected links, said center cutter elements each having a flat blade portion with a forward transverse cutting edge in a horizontal plane which is normal to the vertical median plane of the chain, each blade portion of said center cutter elements having a longitudinally curved outer surface extending rearwardly and inwardly from its cutting edge; and side cutter elements positioned on opposite sides of the chain for cutting a kerf in the material to be sawed, said side cutter elements comprising shank portions which extend vertically outwardly from selected side links and toe portions which extend from the outer edge of said shank portions, each toe portion having a longitudinally curved outer surface extending rearwardly and inwardly from its cutting edge, said shank portions being offset laterally from said selected side links, said shank portions having substantially flat surfaces, each cutting edge on each toe portion being at an approximate right angle to the plane of its selected side link, and said cutting edge on said center cutter elements extending farther vertically outwardly than said toe portions.

5. In a saw chain: side links and center links disposed along a vertical median plane of the chain and alternately connected by hinge means disposed on transverse hinge axes; center cutter elements for cutting a groove in the material to be sawed extending vertically outwardly from selected links, said center cutter elements each having a flat blade portion with a forward transverse cutting edge in a horizontal plane which is normal to the vertical median plane of the chain; and side cutter elements positioned on opposite sides of the chain for cutting a kerf in the materail to be sawed, said side cutter elements comprising shank portions which extend vertically outwardly from selected side links and toe portions which extend from the outer edge of said shank portions, and said cutting edge on said center cutter elements extending farther, vertically outwardly than said toe portions, each toe portion having a cutting edge substantially perpendicular to the plane of its selected link.

6. In a saw chain: side links and center links disposed along a vertical median plane of the chain and alternately connected by hinge means disposed on transverse hinge axes; and a plurality of cutting units each comprising a pair of allochiral center cutter elements followed by a pair of allochiral side cutter elements, said center cutter elements extending vertically outwardly from selected links, and being adapted to cut a groove in the material to be sawed, each of said center cutter elements having a laterally offset blade with a forward transverse cutting edge in a horizontal plane which is normal to the vertical median plane of the chain, said side cutter elements positioned on opposie sides of the chain for cutting a kerf in the material to be sawed, said side cutter elements comprising shank portions which extend vertically outwardly from selected said side links and toe portions which extend from the outer edge of said shank portions, and said cutting edges of said center cutting elements extending farther vertically outwardly than said toe portions.

7. In a saw chain: side links and center links disposed along a vertical median plane of the chain and alternately connected by hinge means disposed on transverse hinge axes; center cutter elements for cutting a groove in the material to be sawed extending vertically outwardly from selected links, each of said center cutter elements having a laterally offset shank having a forward transverse cutting edge in a horizontal plane which is normal to the vertical median plane of the chain, said forward transverse cutting edge being of substantially the same width as said shank, the vertical median plane of said chain extending through each of the cutting edges of the center cutter elements; and side cutter elements positioned on opposite sides of the chain for cutting a kerf in the materail to be sawed, said side cutter elements comprising shank portions which extend vertically outwardly from selected side links and toe portions which extend from the outer edge of said shank portions, said toe portions extending transversely toward and terminating laterally outwardly of the vertical center plane of said chain, said toe portions terminating laterally inwardly of the cutting edges of said center cutters, the successive toe portions along said chain extending in opposite transverse directions, and said center cutter elements extending farther vertically outwardly than said toe portions.

References Cited in the file of this patent
UNITED STATES PATENTS

| | | |
|---|---|---|
| 2,508,784 | Cox | May 23, 1950 |
| 2,713,276 | Siverson | July 19, 1955 |
| 2,725,083 | Ackley | Nov. 29, 1955 |
| 2,832,180 | Carlton | Apr. 29, 1958 |
| 2,832,380 | Crowe | Apr. 29, 1958 |
| 2,850,057 | Carlberg | Sept. 2, 1958 |
| 2,854,041 | Siverson | Sept. 30, 1958 |
| 2,857,942 | Mall | Oct. 28, 1958 |
| 2,989,096 | Irgens | June 20, 1961 |
| 3,066,711 | Winnlert et al. | Dec. 4, 1962 |

FOREIGN PATENTS

| | | |
|---|---|---|
| 515,241 | Canada | Aug. 2, 1955 |